United States Patent [19]
Takao et al.

[11] Patent Number: 5,909,329
[45] Date of Patent: Jun. 1, 1999

[54] HIGH-SPEED VIDEO PRINTER WITH TRACKING ADJUSTMENT OF SLAVE TAPE

[75] Inventors: Yoshiki Takao; Masashi Oshima, both of Tokyo, Japan

[73] Assignee: Sony Magnescale Inc., Tokyo, Japan

[21] Appl. No.: 08/475,084

[22] Filed: Jun. 7, 1995

[30] Foreign Application Priority Data

Jun. 16, 1994 [JP] Japan .................................. 6-134504

[51] Int. Cl.⁶ ...................................................... G11B 5/86
[52] U.S. Cl. ................................ 360/15; 360/26; 360/54; 386/58
[58] Field of Search ................................... 360/15, 16, 26, 360/31, 53, 54, 13; 386/46, 52, 56, 57, 58

[56] References Cited

U.S. PATENT DOCUMENTS

| | | | |
|---|---|---|---|
| 3,743,769 | 7/1973 | Yano et al. | 178/6.6 A |
| 4,101,938 | 7/1978 | Hanai | 360/16 |
| 4,342,057 | 7/1982 | LaBeau et al. | 360/26 X |
| 4,768,107 | 8/1988 | Kobayashi et al. | 360/17 |
| 5,337,195 | 8/1994 | Ito et al. | 360/15 X |
| 5,424,880 | 6/1995 | Nakano et al. | 360/26 |

FOREIGN PATENT DOCUMENTS

| | | |
|---|---|---|
| 58-23330 | 2/1983 | Japan . |
| 2-247823 | 10/1990 | Japan . |

OTHER PUBLICATIONS

Batch Winding Transfer Device; Patent Abstracts of Japan, vol. 8, No. 183, p. 296, Aug. 23, 1984 Kazumasa.
Quadruplex Magnetic Transfer Mirror Image Master Recording; IBM Technical Disclosure Bulletin, vol. 14, No. 1, pp. 141–142, Jun. 1971.

*Primary Examiner*—Andrew L. Sniezek
*Attorney, Agent, or Firm*—Foley & Lardner

[57] ABSTRACT

A video printer for printing a magnetic pattern of a master tape on a slave tape comprises a read head for reading a control signal printed on the slave tape, a phase shift circuit for shifting a phase of the control signal read by the read head, and a write head disposed downstream of the read head with respect to a running direction of the second tape and for rewriting on the second tape the control signal with the phase shifted by the phase shift circuit.

9 Claims, 7 Drawing Sheets

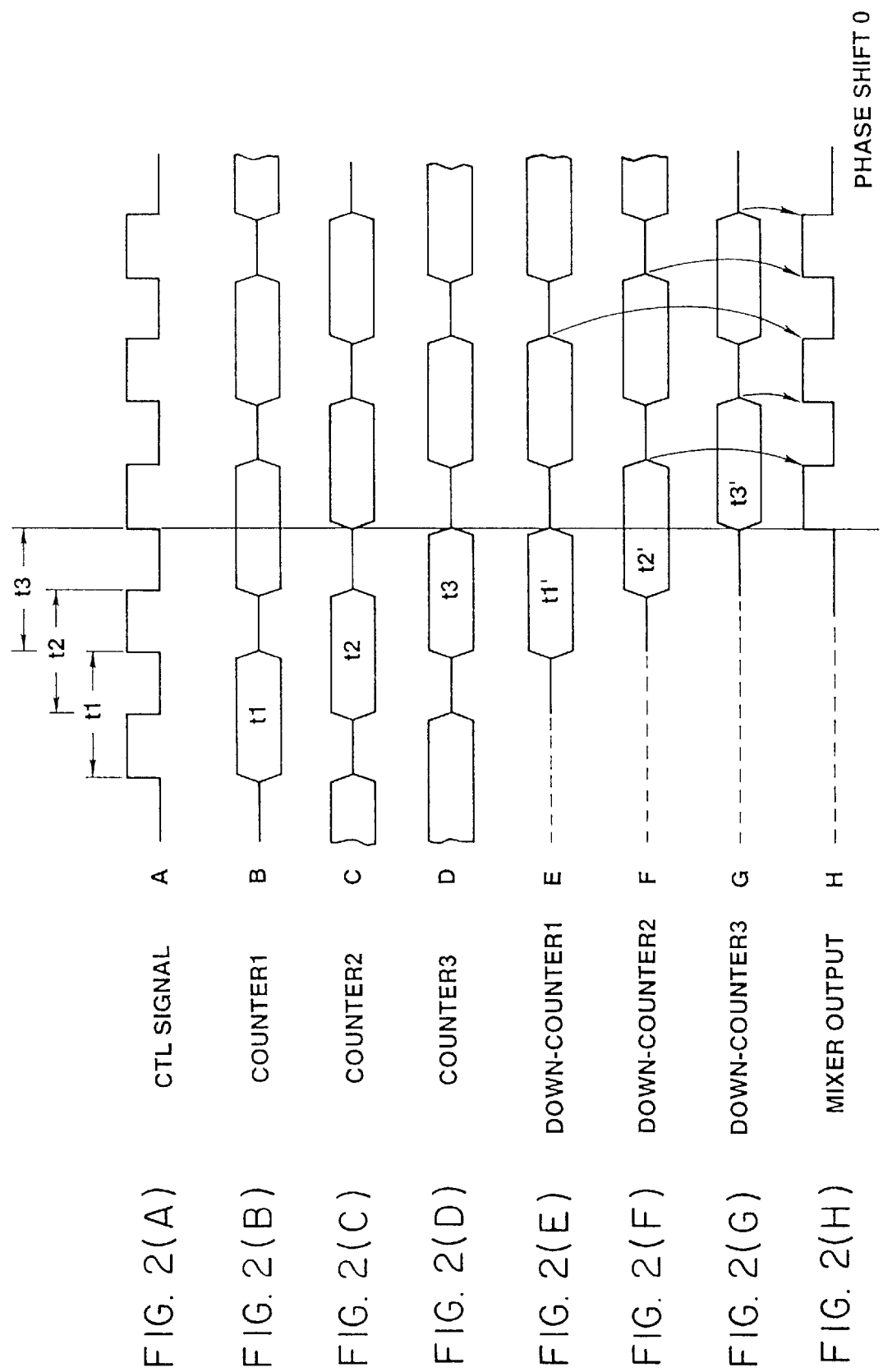

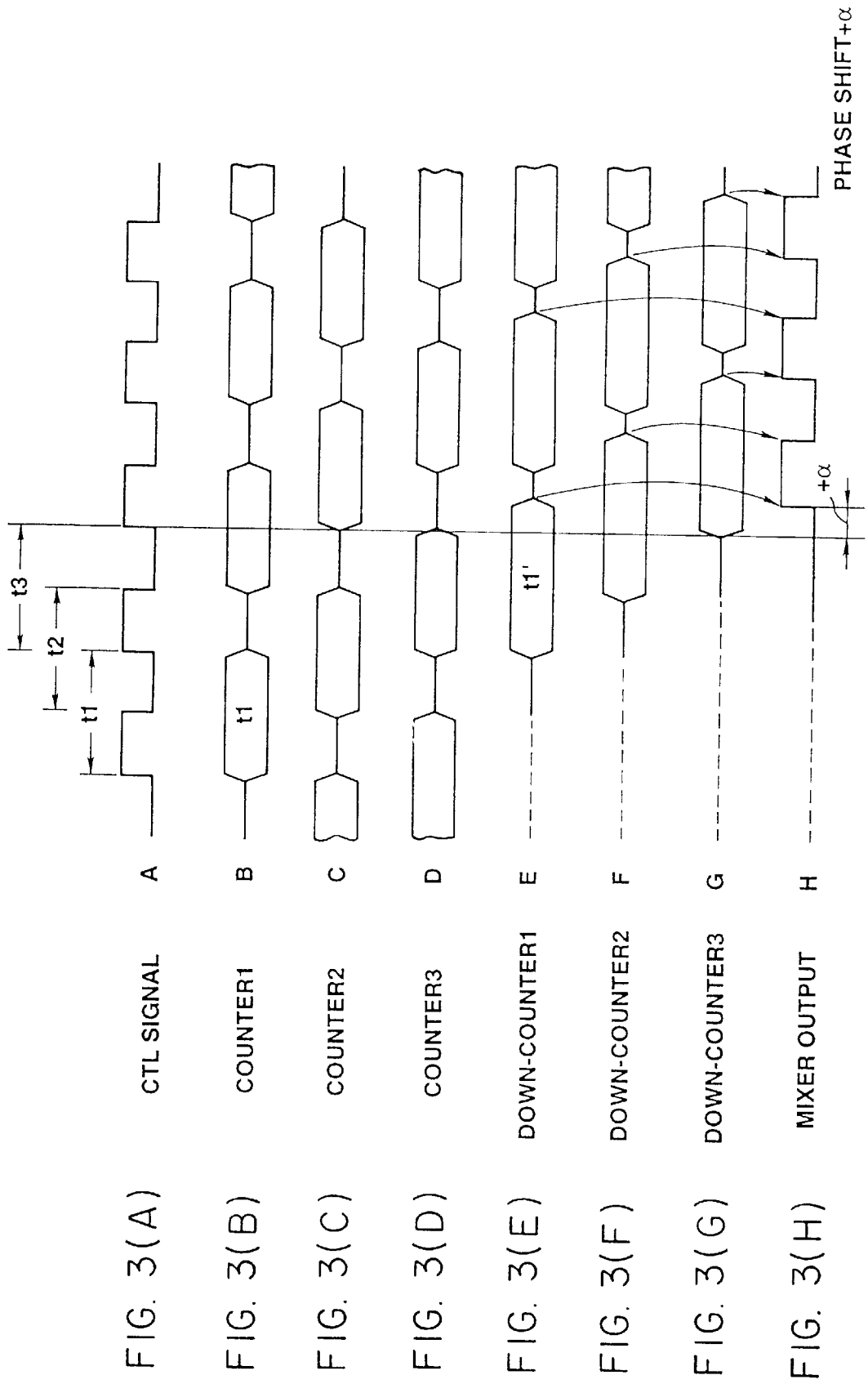

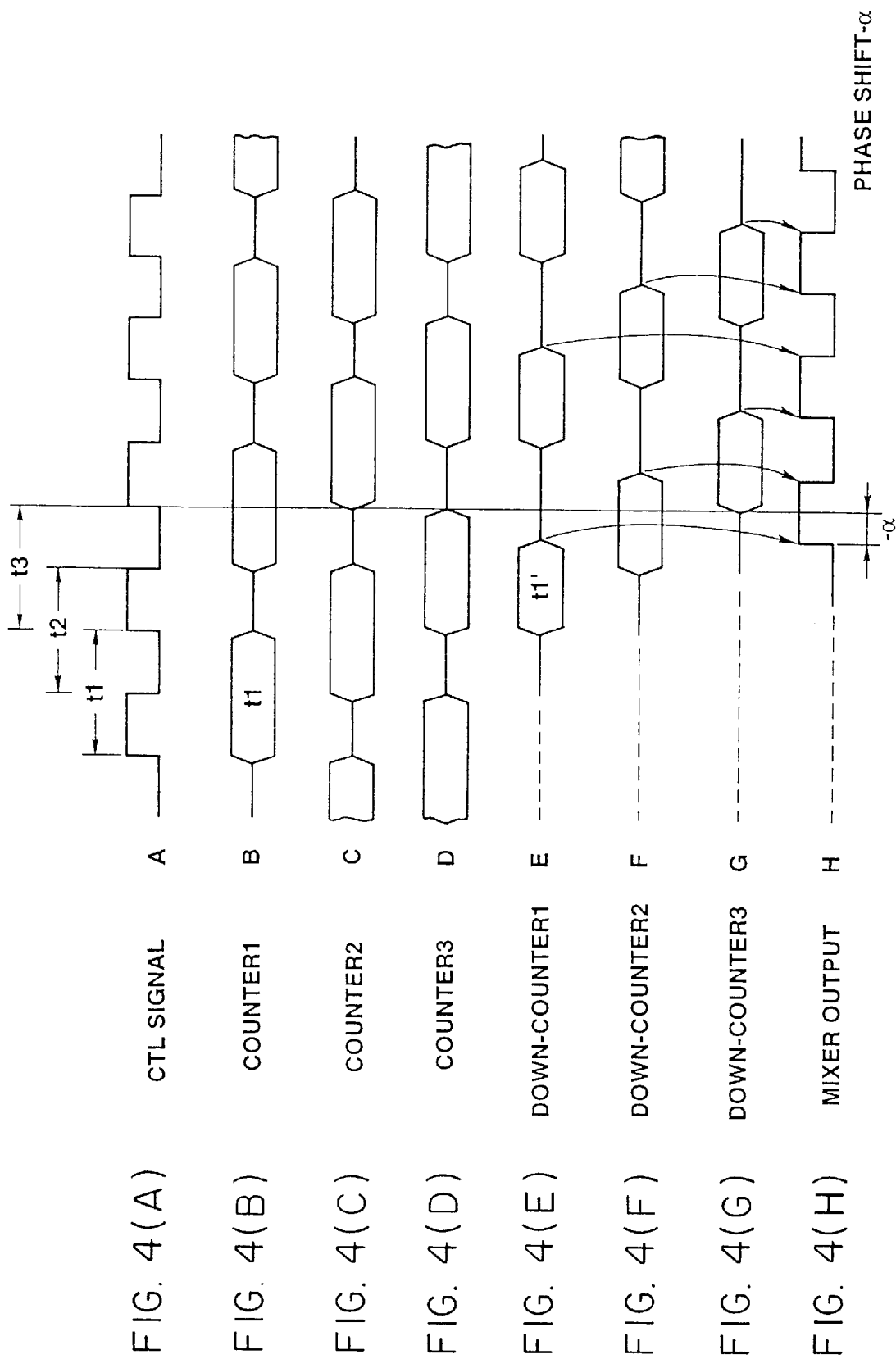

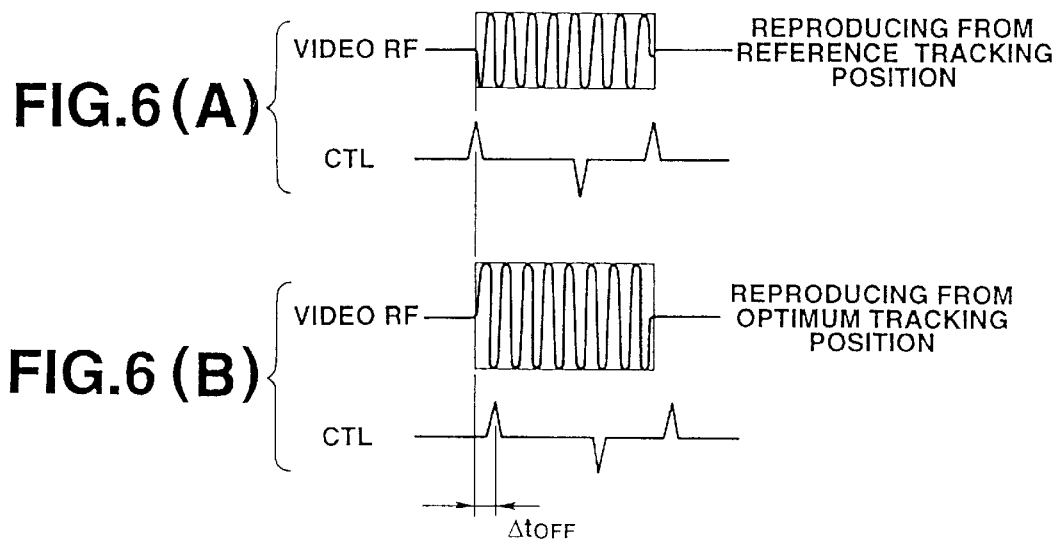
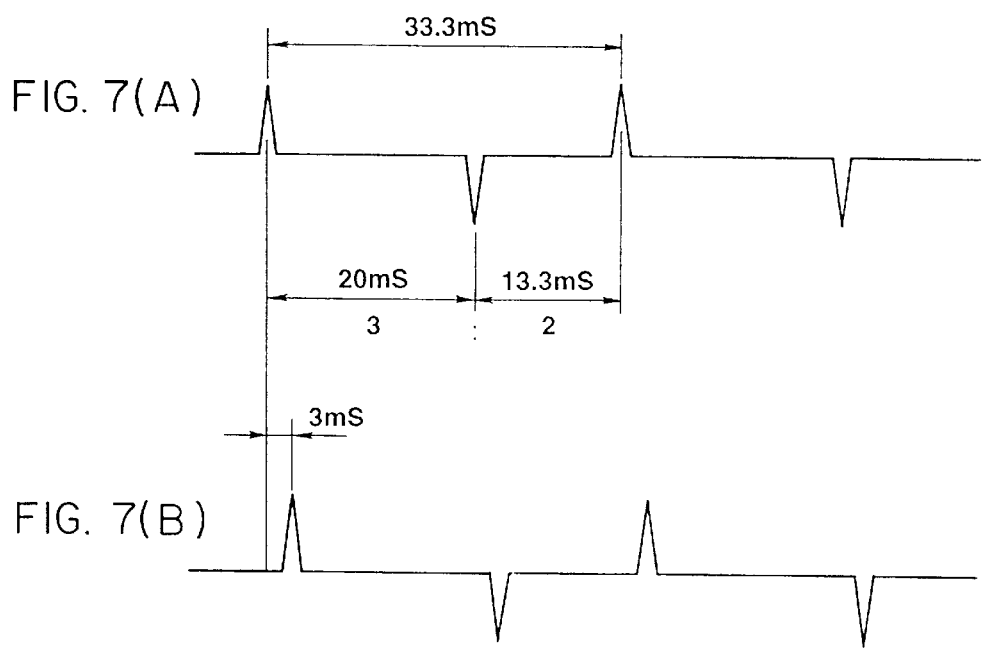

HIGH-SPEED VIDEO PRINTER WITH TRACKING ADJUSTMENT OF SLAVE TAPE

BACKGROUND OF THE INVENTION

The present invention relates generally to a video printer and more particularly, to the tracking adjustment of a slave tape in a high-speed video printer.

One of the conventional methods of making reproduction of magnetic tapes uses a printer for magnetic tapes. This printer is constructed to print a magnetic pattern of a master tape on a copy or slave tape by directly contacting magnetic surfaces of the master and copy tapes with each other, to which heat or magnetic field is applied.

A general task to be fulfilled by the printer is to print a geometric magnetic pattern of the master tape on the copy tape as correctly as possible. In view of such task, JP-A 58-23330 proposes a technique of preventing lateral displacement between the master and copy tapes. JP-A 2-247823 proposes a technique of arranging a positioning means by which side ends of the running master and copy tapes coincide completely with each other.

When printing is carried out by only one video printer and one master video tape recorder (VTR) for recording a video signal on the master tape under restricted conditions, the above techniques proposed by JP-A 58-23330 and JP-A 2-247823 are effective. However, when printing is carried out by a plurality of video printers and master VTRs over a long period of time to produce copy tapes, a problem of compatibility between the devices becomes serious which does not arise when using only one video printer and one master VTR.

Referring to FIGS. 5A–5C, a description will be made with regard to this problem. FIG. 5A shows a format of a master tape 501, which has a video signal track 502 and control (CTL) signal 503 recorded thereon.

FIG. 5B shows a format of a slave or copy tape 511, which has a video signal track 512 and CTL signal 513 printed thereto. Reference numeral 514 designates an initial position of a reproducing head.

FIG. 5C shows the slave tape 511 displaced with respect to the master tape 501 upon printing. In case of FIG. 5C, the slave tape 511 indicated by a fully-drawn line is displaced upward with respect to the master tape 501 indicated by a dotted line.

As for reproduction of the copy tape, suppose that when a video signal track and a CTL signal are printed in the state that the master tape 501 as shown in FIG. 5A and the slave tape 511 as shown in FIG. 5B coincide completely with each other in the tape cross direction, a position of a reproducing head of a reproducing device with respect to the CTL signal is adjusted so that the initial position 514 of the reproducing head with respect to the CTL signal 513 is in the center of the video signal track 512 as shown in FIG. 5B.

If printing is carried out in the state that the slave tape 511 is displaced upward as shown in FIG. 5C, the video signal track 512 printed from the master tape 501 to the slave tape 511 has a start position near a lower edge of the slave tape 511.

Referring to FIG. 5C, upon reproduction of the slave tape 511, as being adjusted to have a predetermined height "h" from the lower edge of the slave tape 511, the reproducing head occupies a position 516 with respect to a recorded position of the CTL signal. Thus, the video signal track 512 cannot be read out by a center portion of the reproducing head, i.e. track displacement is produced.

Therefore, in order to make the reproducing head pass a center portion of the video signal track 512 and occupy a position 515 with respect to the CTL signal, the reproducing head should parallelly be moved by one in the longitudinal direction of the slave tape 511.

The same problem arises when reproduction of a tape copied from a different master tape from that one as shown in FIG. 5A is carried out by the reproducing device having a reproducing head height "h" as shown in FIG. 5B.

Therefore, with the conventional high-speed video printer, the height of guides in a tape running system should be always controlled and maintained to keep displacement between the master and slave tapes upon printing within an error of several microns.

Moreover, when using a plurality of master tapes having different CTL signal positions, the height of the guides should be adjusted every tape change, resulting in a lowering of the productivity.

As for a procedure of conventional tracking adjustment, first, a video signal recorded on the master tape is printed on the slave tape according to the above method, producing a sample tape.

Then, the sample tape is wound in a cassette. This sample cassette is set in a reference reproducing device to reproduce a video signal as recorded therein. At that time, an output signal of the reproducing device is measured by a measuring device such as an oscilloscope.

Tracking adjustment is carried out in observing a waveform of the output signal displayed on the oscilloscope. Specifically, a position of the reproducing head is adjusted so that the amplitude of a video radio frequency (RF) signal or reproduced video signal is maximum. At that time, the reproducing head occupies the position 515 as shown in FIG. 5C, so that if a video signal is reproduced from the position 515, the reproducing head can trace the center portion of the video signal track 512.

However, if displacement of a lower edge of the sample tape is greater than a predetermined value due to displacement with respect to the master tape upon printing, etc., the position 515 of the reproducing head when having the maximum video RF signal is displaced with respect to the normal tracking start position 516 as shown in FIG. 5C, producing displacement between a position of the CTL signal and a start position of the video RF signal, which corresponds to track displacement.

If track displacement is within tolerance, it is judged that this track displacement is allowable, finishing tracking adjustment to carry out mass production of the tapes. If not, the height of the guides of the video printer is changed by in the order of several microns, and the above procedure is repeatedly carried out.

The work of adjusting the amount of track displacement in the reference reproducing device by the height of the guides of the video printer is difficult, even for a skilled person, to accomplish decisively, requiring usually some additional adjustment. This results in a lowering of the productivity upon mass printing of the tape.

It is, therefore, an object of the present invention to provide a video printer which is free from the above drawback and enables easy adjustment of track displacement.

SUMMARY OF THE INVENTION

According to one aspect of the present invention, there is provided a video printer for printing a magnetic pattern of a first tape on a second tape, the magnetic pattern including a control signal, the video printer comprising:

a read head arranged to read the control signal on the second tape;

a phase shift circuit connected to said read head, said phase shift circuit serving to shift a phase of the control signal read by said read head; and a write head connected to said phase shift circuit, said write head being disposed downstream of said read head with respect to a running direction of the second tape, said write head serving to rewrite on the second tape the control signal with said phase shifted by said phase shift circuit.

Another aspect of the present invention lies in providing a video printer for printing a magnetic pattern of a first tape on a second tape, the magnetic pattern including a control signal, the video printer comprising:

means for reading the control signal on the second tape;

means for shifting a phase of the control signal read by said reading means; and means, disposed downstream of said reading means with respect to a running direction of the second tape, for rewriting on the second tape the control signal with said phase shifted by said shifting means.

BRIEF DESCRIPTION OF THE DRAWINGS

FIGS. 2A–2H are schematic waveform charts for explaining an operation of the phase shift circuit;

FIGS. 3A–3H are views similar to FIGS. 2A–2H, for explaining an operation of the phase shift circuit;

FIGS. 4A–4H are views similar to FIGS. 3A–3H, for explaining an operation of the phase shift circuit;

FIGS. 6A–6B are waveform charts for explaining a method of measuring the amount of track displacement;

FIGS. 7A–7B are views similar to FIGS. 6A–6B, showing the CTL signal in the VHS standard mode.

DETAILED DESCRIPTION OF THE INVENTION

Figure 8:
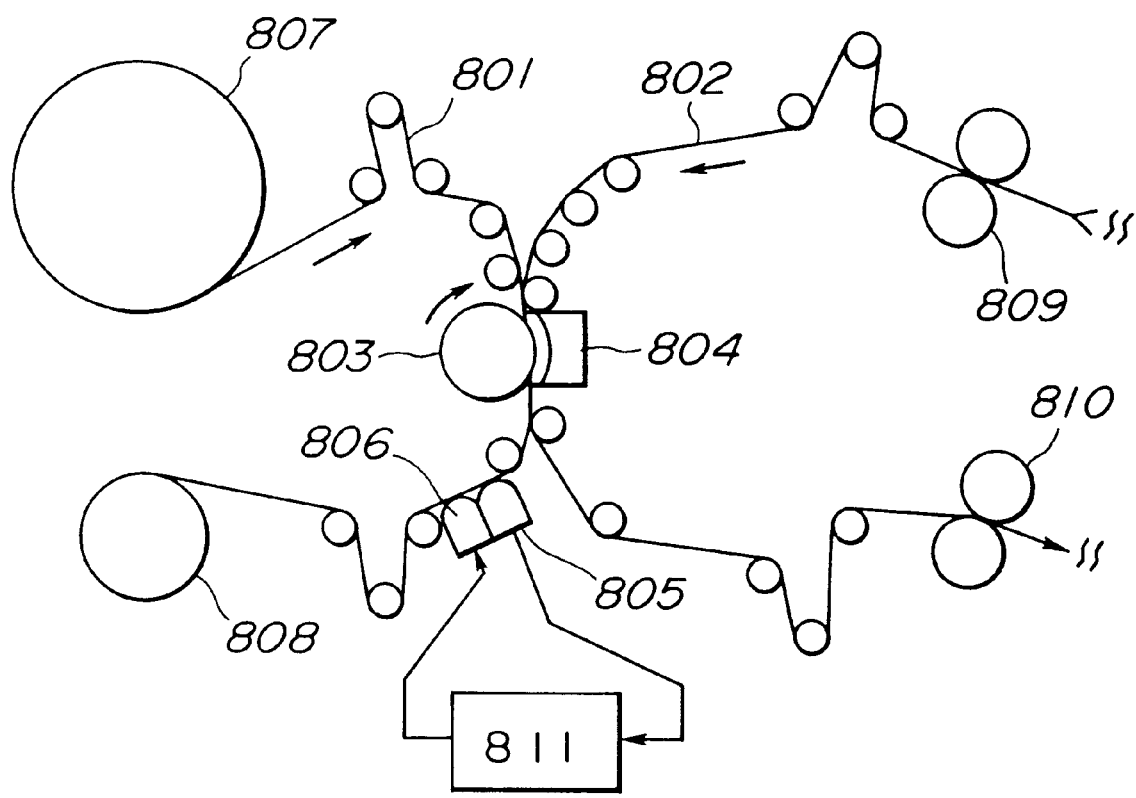
FIG. 8 is a view similar to FIGS. 5A–5C, showing the video printer.

Referring first to FIG. 8, a video printer embodying the present invention comprises a copy tape 801, a master tape 802, a printing drum 803, a bias head block 804, a CTL signal read head 805, a CTL signal write head 806, a copy tape supply reel 807, a copy tape take-up reel 808, a master tape supply capstan 809, a master tape take-up capstan 810, and a phase shift circuit 811.

The master tape 802 is supplied through the master tape supply capstan 809, and contacted with the copy tape 801 by the printing drum 803, and then wound through the master tape take-up capstan 810. On the other hand, the copy tape 801 is supplied from the copy tape supply reel 807, and contacted with the master tape 802 by the printing drum 803 to print a video signal recorded on the master tape 802, and then wound to the copy tape take-up reel 808.

When the master tape 802 and the copy tape 801 pass between the printing drum 803 and the bias head block 804 in contacting magnetic surfaces thereof with each other, a magnetic pattern of the master tape 802 is printed on the copy tape 801.

At that time, in addition to a video signal, an audio signal, etc., a CTL signal is also printed on the copy tape 801. Therefore, the CTL signal is read by the CTL signal read head 805 when the copy tape 801 passes thereon.

The phase of the CTL signal as read is shifted in the phase shift circuit 811, which is then rewritten on the copy tape 801 by the CTL signal write head 806. As a result, a position of the CTL signal of the copy tape 801 wound to the copy tape take-up reel 808 is displaced forward or backward with respect to a position of the CTL signal of the master tape 802 to the extent shifted by the phase shift circuit 811. Therefore, according to this method, a position of the CTL signal of the copy tape 801 can be adjusted without adjusting tape guides.

A more detailed description will be made with regard to the phase shift circuit 811.

Figure 1:
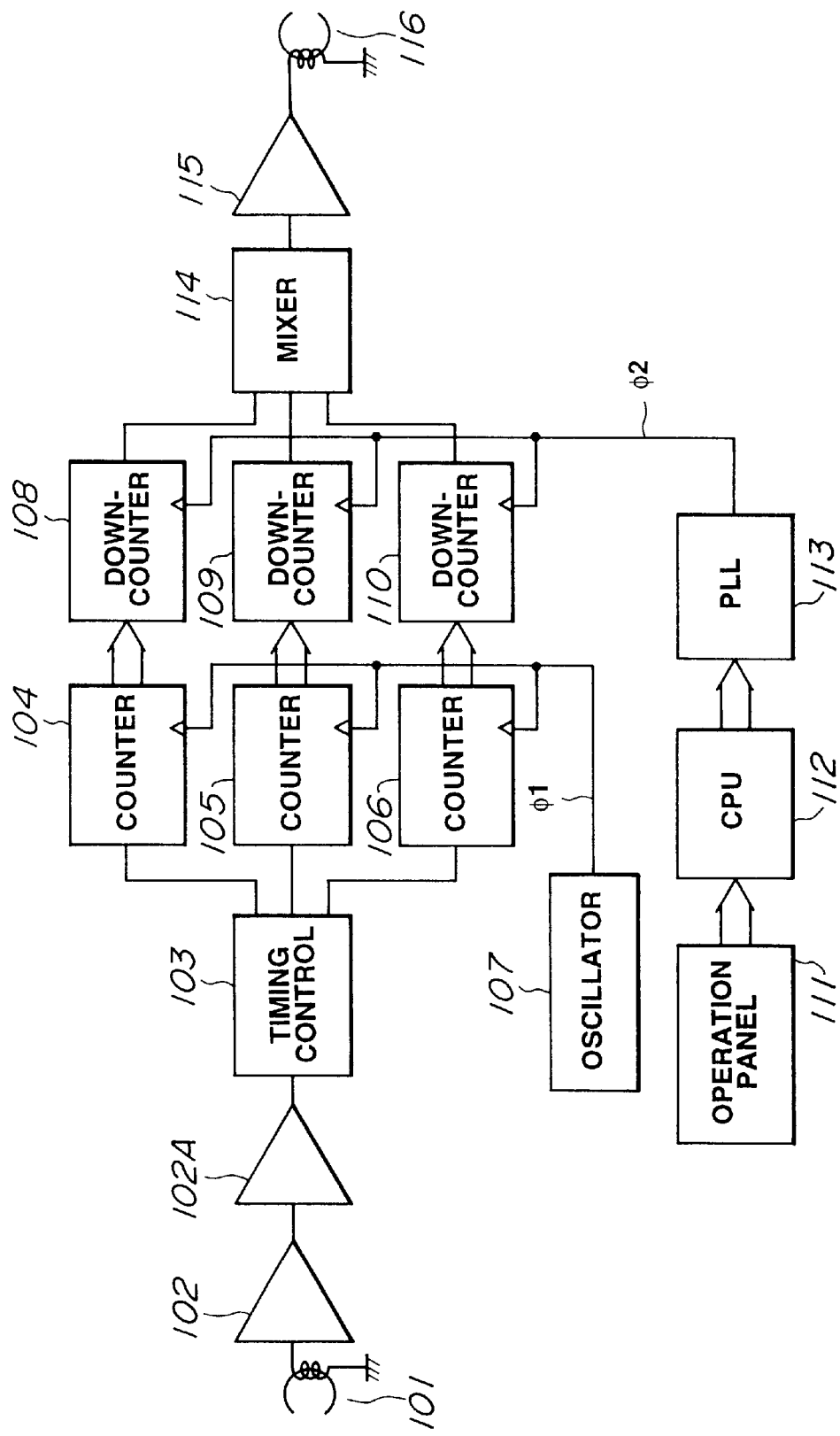
FIG. 1 is a block diagram showing an example of a phase shift circuit used in a video printer embodying the present invention.
Figure 5A:
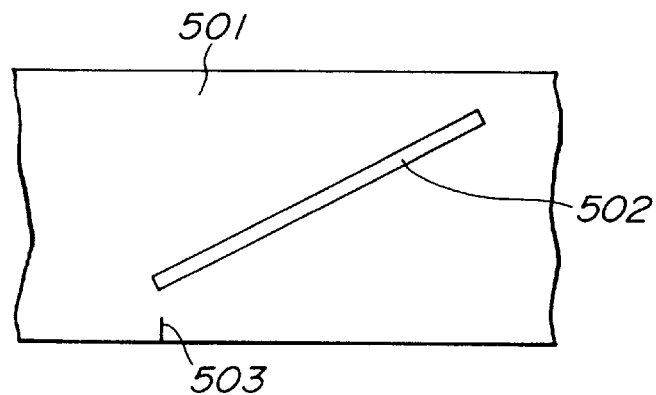
FIGS. 5A–5C are schematic views showing the relationship between a video signal track, CTL signal, and reproducing head.
Figure 5B:
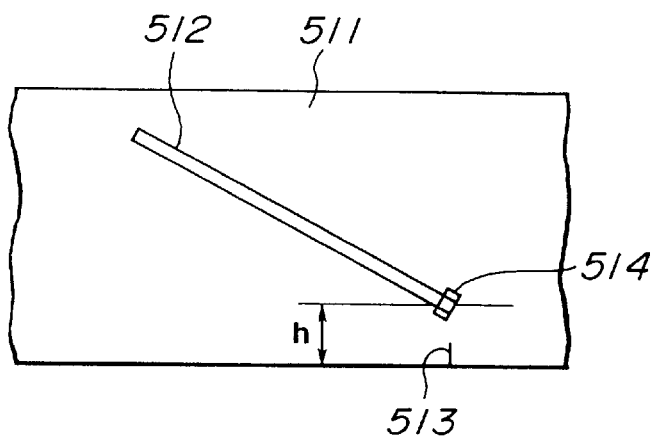
Figure 5C:
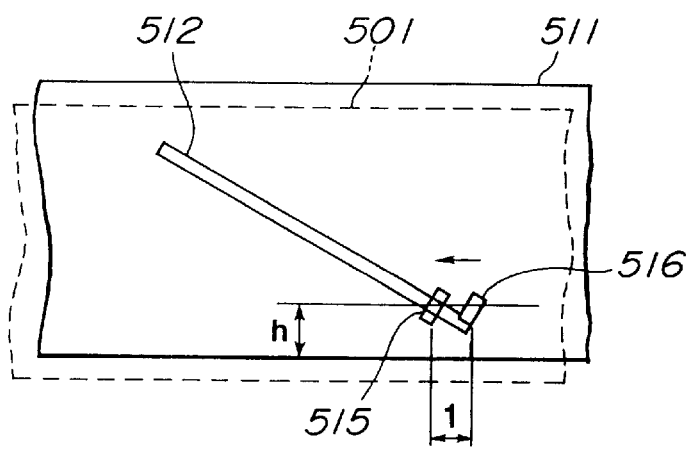

FIG. 1 shows an example of the phase shift circuit 811 that comprises a CTL signal reproducing head 101, an amplifier 102, a hysteresis comparator 102A, and a timing control logic circuit 103.

Three counters 104, 105, 106 are operated according to a clock signal $\phi 1$ generated by an oscillator 107, whereas three down-counters 108, 109, 110 are operated according to the other clock signal $\phi 2$.

An operation panel or console 111, a central processing unit (CPU) 112, and a phase locked loop (PLL) 113 are arranged to produce the other clock signal $\phi 2$. Outputs of the three down-counters 108, 109, 110 are provided to a mixer 114 to obtain a mixed output, which is amplified by a power amplifier 115, then provided to a CTL signal recording head 116.

Referring to FIGS. 2A–2H, an operation of the phase shift circuit 811 as shown in FIG. 1 will be described.

The CTL signal read by the CTL signal reproducing head 101 and output from the hysteresis comparator 102A is a rectangular wave having a predetermined duty as indicated by A in FIGS. 2A–2H. This rectangular wave A that is detected by the timing control logic circuit 103 activates the first counter, e.g. counter 104, at a rise of the wave, which starts counting of the clock signal $\phi 1$ derived from the oscillator 107 as indicated by B in FIGS. 2A–2H.

The second counter 105 starts counting of the clock signal $\phi 1$ at a fall of the rectangular wave A as indicated by C in FIGS. 2A–2H. At a next rise of the rectangular wave A, the third counter 106 starts counting of the clock signal $\phi 1$, whereas the first counter 104 stops counting thereof, which is transferred to the first down-counter 108 in the next stage.

At a next fall of the rectangular wave A, the first counter 104 starts counting of the clock signal $\phi 1$ again, whereas the second counter 105 stops counting thereof, which is transferred to the second down-counter 109 in the next stage.

Likewise, at a subsequent rise of the rectangular wave A, the second counter 105 starts counting of the clock signal $\phi 1$ again, whereas the third counter 106 stops counting thereof, which is transferred to the third down-counter 110 in the next state.

The counters 104, 105, 106 serve to measure the period of the CTL signal recorded on the copy tape 801 at predetermined intervals by counting the length between a rise of the CTL signal as rectangular wave A and a fall thereof through the clock signal $\phi 1$. That is, this counting contributes to measurement of a running speed of the copy tape 801.

Count values transferred to the down-counters 108, 109, 110 are counted in the direction of subtraction through the other clock signal $\phi 2$. When the count values are returned to initial values or values before transfer of the count values, e.g. zero, the down-counters 108, 109, 110 output a pulse, respectively. Since all outputs of the down-counters 108, 109, 110 are provided to the mixer 114 to form a series of pulses, the mixer 114 has an output inverted or turned on and off by the pulses as indicated by H in FIGS. 2A–2H.

If the cycle period of the clock signal φ1 given to the counters 104, 105, 106 is equal to that of the clock signal φ2 given to the down-counters 108, 109, 110, the length of a count time t1 of the counter 104 is equal to that of a count time t1' of the down-counter 108, and also the lengths of count times t2, t3 of the counters 105, 106 are equal to those of count times t2', t3' of the down-counters 109, 110, respectively. Thus, the output signal H of the mixer 114 turned on and off at a completion of counting of the down-counters 108, 109, 110 has the same phase as the CTL signal as reproduced.

Referring to FIGS. 3A–3H, descriptions will be made with regard to a case of delaying the phase by α through the phase shift circuit 811 as shown in FIG. 1. In that case, the CTL signal read by the CTL signal reproducing head 101 (see waveform A in FIG. 3) is counted by the counters 104, 105, 106 (see waveforms B, C, D in FIG. 3) in the same way as described in connection with FIGS. 2A–2H, while the lengths of times counted by the down-counters 108, 109, 110 (see waveforms E, F, G in FIG. 3) are greater than those in the case of FIGS. 2A–2H.

Specifically, by way of example, the count time t1 ranging from a first rise of the CTL signal to a second rise thereof (see waveform A in FIG. 3) is counted by the first counter 104, which is transferred to the first down-counter 108 in the next stage. The first down-counter 108 subtracts one from the count value every arrival of the clock signal φ2, and stops counting when the count value is equal to an initial value or a value before transfer of the count value, e.g. zero, to output a pulse. If the cycle period of the clock signal φ2 is determined to be greater than that of the clock signal φ1, the count time t1' of the first down-counter 108 is greater than the count time t1 of the counter 104, so that a counting completion point of the down-counter 108 is displaced forward (see waveform E in FIG. 3), obtaining phase shift to that extent.

FIGS. 4A–4H show a case that the phase is advanced by α. In that case, the CTL signal read by the CTL signal reproducing head 101 (see waveform A in FIG. 4) is counted by the counters 104, 105, 106 (see waveforms B, C, D in FIG. 4) in the same way as described in connection with FIGS. 2A–2H.

As for the lengths of times counted by the down-counters 108, 109, 110 (see waveforms E, F, G in FIG. 4), they are smaller than those of the case as shown in FIGS. 2A–2H. Specifically, by way of example, the count time t1 ranging from a first rise of the CTL signal to a second rise thereof (see waveform A in FIG. 3) is counted by the first counter 104, which is transferred to the first down-counter 108 in the next stage. The first down-counter 108 subtracts one from the count value every arrival of the clock signal φ2, and stops counting when the count value is equal to an initial value or a value before transfer of the count value, e.g. zero, to output a pulse.

At that time, since the cycle period of the clock signal φ2 is smaller than that of the clock signal φ1, i.e. the frequency of the clock signal φ2 is higher than that of the clock signal φ1, the count time t1' of the first down-counter 108 is smaller to output a pulse earlier. Thus, the mixer 114 provides an output to that extent, obtaining advanced phase.

The relationship between the clock signals φ1, φ2 can be obtained by the following formula:

$$\phi 2 = \phi 1 \times \frac{\Delta t + \alpha}{\Delta t} \quad (1)$$

wherein Δt is a cycle period (in seconds) of one channel during reproduction of a video cassette recorder (VCR), and α is the amount of phase shift (in seconds) of the CTL signal during reproduction of the VCR.

The amount of phase shift $_\alpha$ of the CTL signal is derived from the formula (1):

$$\alpha = (\phi 2/\phi 1 - 1)\Delta t \quad (2)$$

As seen from the formula (2), if the clock signal φ2 is changed by varying the oscillation frequency of the PLL circuit 113 by a command of the CPU 112, the phase can freely be advanced and delayed by $_\alpha$.

It is noted that the period of the clock signals φ1, φ2 should be fully smaller than that of the CTL signal as printed, i.e. the frequency of the clock signals should be fully higher than that of the CTL signal as printed.

In the above description, the amount of phase shift $_\alpha$ is determined by the ratio of the clock signal φ1 to the clock signal φ2. Alternatively, a certain number of count values determined according to the amount of phase shift $_\alpha$ may be preset in the down-counters 108, 109, 110. In that case, counting is possible by using the same clock signal, i.e. the clock signal φ1 in place of the clock signal φ2.

If tape copy is treated as complete only when the tape runs at a constant speed, the phase shift circuit 811 may be replaced with a delay circuit for ensuring a predetermined time of delay, obtaining a simplified video printer.

Referring next to FIGS. 6A–7B, phase shift of the CTL signal in the VHS standard mode will be described.

Referring to FIGS. 6A–6B, the amount of track displacement is measured by the reference reproducing device as follows. FIG. 6A shows a case of reproducing the tape from the reference tracking position wherein the beginning of the video RF signal coincides with the CTL signal, while the level or amplitude of the video RF signal is small, having track displacement.

Then, the phase of the CTL signal is shifted to find a point that the level of the video RF signal is maximum as shown in FIG. 6B. At that time, the beginning of the video RF signal does not coincide with the CTL signal, having phase shift by $\Delta t_{OFF}$.

The point that the level of the video RF signal is maximum as shown in FIG. 6B is an optimum position for reproduction. However, due to phase shift of the CTL signal, it is preferable to rewrite the CTL signal.

FIGS. 7A–7B show a waveform of the CTL signal in the VHS standard mode wherein phase shift $\Delta t_{OFF}$ is 3 ms. It will be thus understood that upon printing of the tape, if the phase of the CTL signal is previously shifted by the reference reproducing device by 3 ms with respect to the CTL signal on the master tape, phase shift of the CTL signal to be produced when carrying out reproduction of the tape by the reference reproducing device can be canceled.

Referring to FIGS. 7A–7B, when a printing speed of the video printer is 5 m/s, a tape speed is 33.35 mm/s in the VHS standard mode, so that the tape speed ratio is 150:1. That is, upon printing, the period of the CTL signal is 33.3 ms/150, i.e. 0.222 ms (222 μs).

When the frequency of the clock signal φ1 in the phase shift circuit 811 is 20 MHz, phase shift $\Delta t_{OFF}$ by +3 ms is obtained if the period of the clock signal φ2 is:

$$\phi2 = (1/20\,\text{MHz})(33.3 + 3)/33.3$$
$$= 5.45 \times 10^{-8}\ (\text{seconds})$$

From this, it is understood that the frequency of the clock signal φ2 is 18.3471 MHz.

On the other hand, phase shift $\Delta t_{OFF}$ by −3 ms is obtained if the period of the clock signal φ2 is:

$$\phi2 = (1/20\,\text{MHz})(33.3 - 3)/33.3$$
$$= 4.5495 \times 10^{-8}\ (\text{seconds})$$

From this, it is understood that the frequency of the clock signal φ2 is 21.98 MHz.

Having described the present invention in connection with the preferred embodiment, it is noted that the present invention is not limited thereto, and various changes and modifications can be made without departing from the spirit of the present invention.

What is claimed is:

1. A video printer for printing a magnetic pattern of a first tape on a second tape, the magnetic pattern including a control signal, the video printer comprising:
   a read head arranged to read the control signal printed on the second tape;
   a phase shift circuit connected to said read head, said phase shift circuit serving to shift a phase of the control signal read by said read head, said phase shift circuit comprising means for detecting a speed of the second tape and means for enabling adjustment of a phase shift of the control signal read by said read head by an adjustable amount with respect to said speed of the second tape detected; and
   a write head connected to said phase shift circuit, said write head being disposed downstream of said read head with respect to a running direction of the second tape, said write head serving to rewrite on the second tape the control signal read by said read head and with said phase adjustably shifted by said phase shift circuit.

2. A video printer as claimed in claim 1, wherein said speed detecting means comprises a counter for counting a period of the control signal read by said read head through a first clock signal.

3. A video printer as claimed in claim 2, wherein said enabling means comprises a down-counter for counting a period of the control signal read by said read head in a direction of subtraction through a second clock signal.

4. A video printer as claimed in claim 3, wherein said enabling means comprises register means for presetting said adjustable amount of said phase shift.

5. A video printer for printing a magnetic pattern of a first tape on a second tape, the magnetic pattern including a control signal, the video printer comprising:
   means for reading the control signal printed on the second tape;
   means for shifting a phase of the control signal read by said reading means, said shifting means comprising means for detecting a speed of the second tape and means for enabling adjustment of a phase shift of the control signal read by said reading means by an adjustable amount with respect to said speed of the second tape detected; and
   means, disposed downstream of said reading means with respect to a running direction of the second tape, for rewriting on the second tape the control signal read by said reading means and with said phase adjustably shifted by said shifting means.

6. A video printer as claimed in claim 5, wherein said speed detecting means comprises a counter for counting a period of the control signal read by said reading means through a first clock signal.

7. A video printer as claimed in claim 6, wherein said enabling means comprises a down-counter for counting a period of the control signal read by said reading means in a direction of subtraction through a second clock signal.

8. A video printer as claimed in claim 7, wherein said enabling means comprises register means for presetting said adjustable amount of said phase shift.

9. A video printer for printing a magnetic pattern of a first tape on a second tape, the magnetic pattern including a control signal, the video printer comprising:
   a read head arranged to read the control signal printed on the second tape;
   a phase shift circuit connected to said read head, said phase shift circuit serving to shift a phase of the control signal read by said read head, said phase shift circuit comprising means for detecting a speed of the second tape and means for enabling adjustment of a phase shift of the control signal read by said read head by an adjustable amount with respect to said speed of the second tape detected; and
   a write head connected to said phase shift circuit, said write head being disposed downstream of said read head with respect to a running direction of the second tape, said write head serving to rewrite on the second tape the control signal read by said read head and shifted with a phase shift adjustment by said phase shift circuit,
   wherein said means for enabling adjustment of a phase shift of the control signal includes a CPU, and
   wherein said CPU dynamically determines and varies the phase shift adjustment responsive to the detected speed of the second tape.

* * * * *